April 20, 1954 R. S. CARR 2,675,773
APPARATUS FOR MAKING TAPERED FLEXIBLE TUBING
Filed May 9, 1950 3 Sheets-Sheet 1
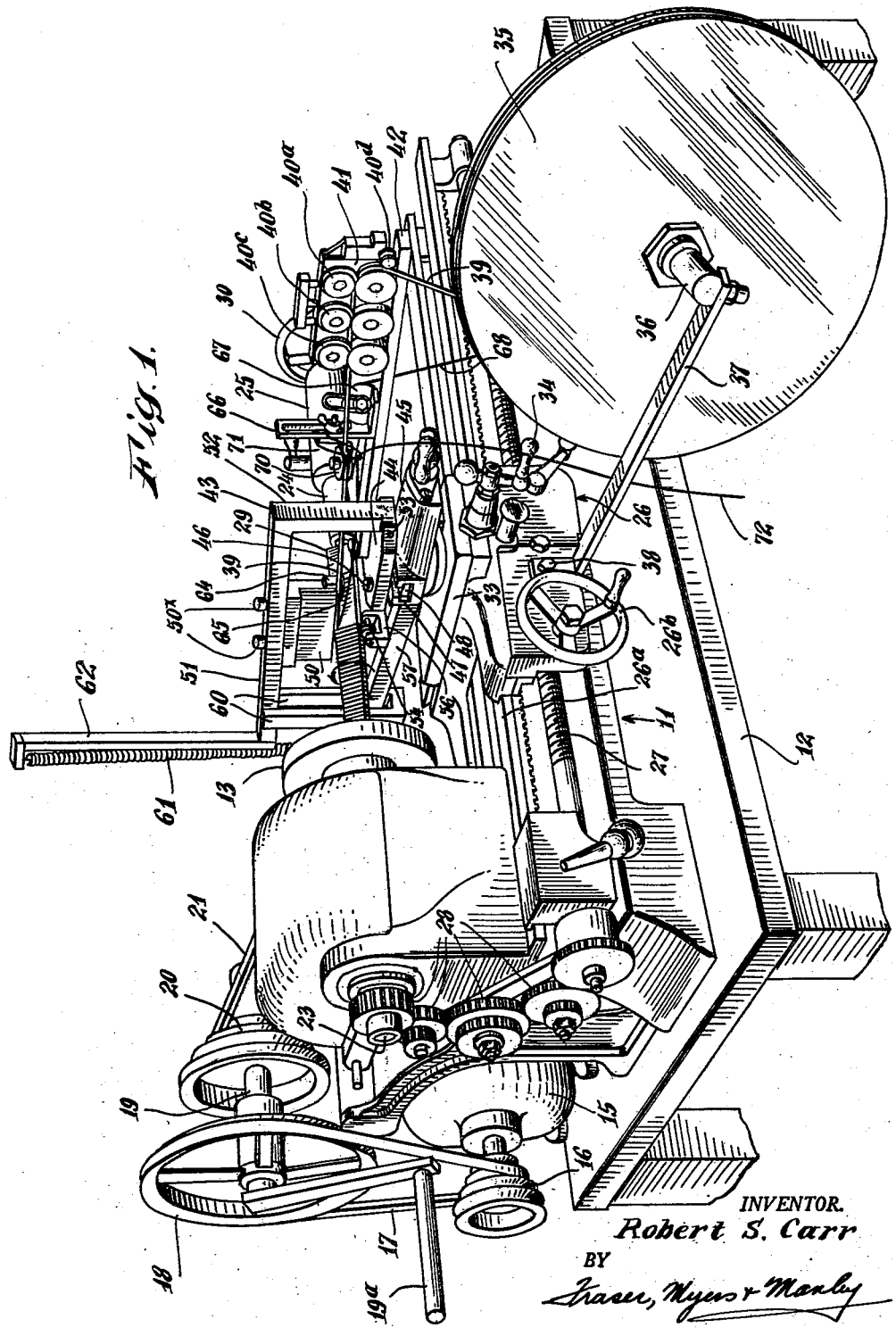
INVENTOR.
Robert S. Carr
BY
Fraser, Myers & Manley
ATTORNEYS.

April 20, 1954  R. S. CARR  2,675,773
APPARATUS FOR MAKING TAPERED FLEXIBLE TUBING
Filed May 9, 1950  3 Sheets-Sheet 2
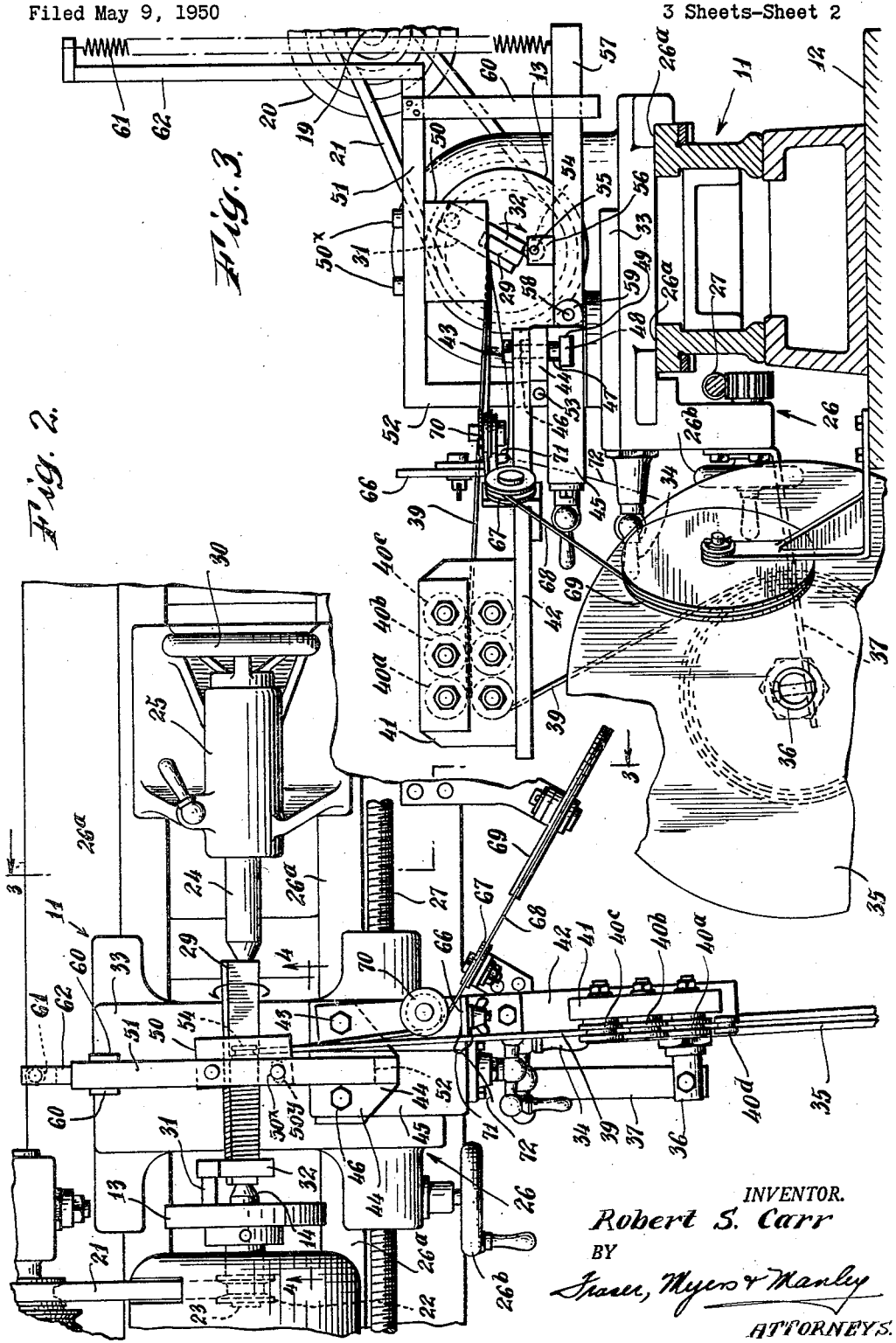
INVENTOR.
Robert S. Carr
BY
Fraser, Myers & Manley
ATTORNEYS.

April 20, 1954   R. S. CARR   2,675,773
APPARATUS FOR MAKING TAPERED FLEXIBLE TUBING
Filed May 9, 1950   3 Sheets-Sheet 3
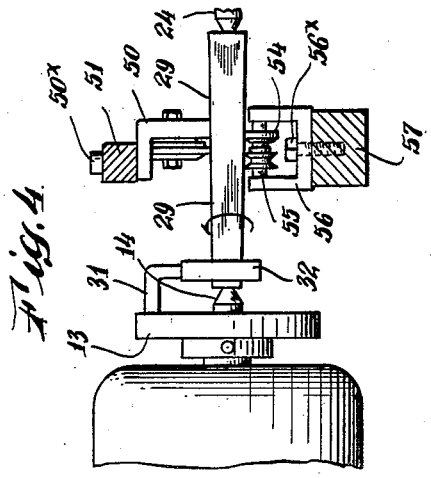
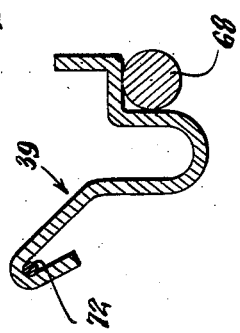
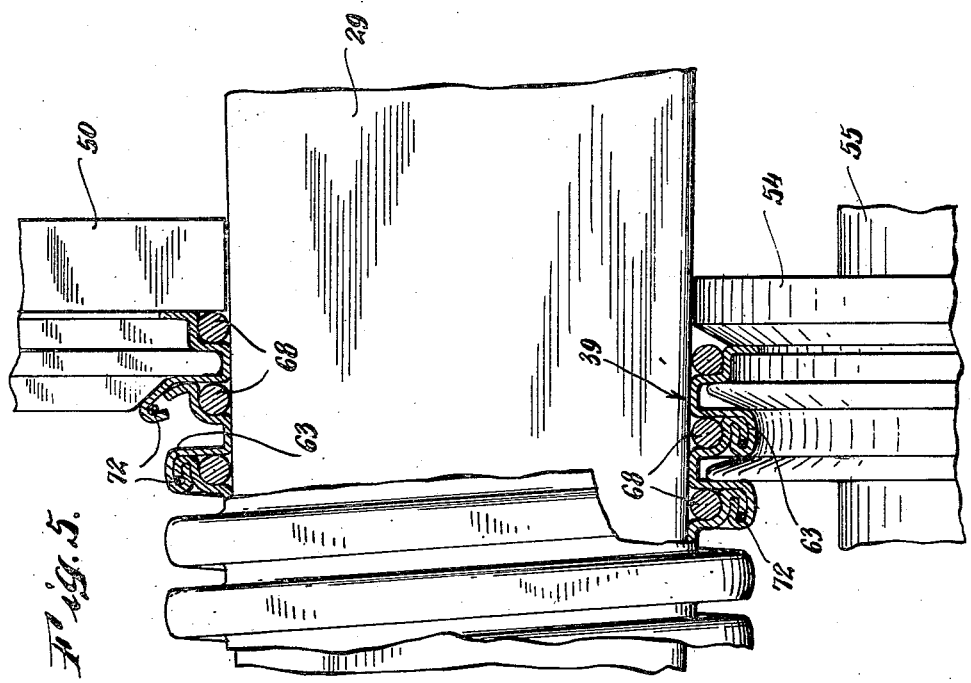
INVENTOR.
Robert S. Carr
BY
Fraser, Myers + Manley
ATTORNEYS.

Patented Apr. 20, 1954

2,675,773

UNITED STATES PATENT OFFICE 2,675,773

APPARATUS FOR MAKING TAPERED FLEXIBLE TUBING

Robert S. Carr, Maplewood, N. J., assignor to Airtron, Inc., Linden, N. J., a corporation of New Jersey Application May 9, 1950, Serial No. 160,901

7 Claims. (Cl. 113—35)

1

The present invention relates to apparatus for manufacturing flexible tubing and, more particularly, relates to apparatus which is capable of manufacturing such tubing which tapers longitudinally instead of being of uniform diameter from end to end.

Various types of apparatus are known which are designed for the production of flexible tubing by spirally winding relatively thin, longitudinally-ribbed strip metal upon an arbor in such manner that adjacent edges of successive turns of the strip interlock to form a continuous interlocked spiral seam which serves to hold the strip in tubular formation. It has been desirable, for some purposes, to form such tubing of polygonal rather than circular shape in cross-section. For example, it has been found that flexible metal tubing which is rectangular in cross-section is useful as a conducting member of flexible waveguides for use in Radar or similar electronic equipment.

I have disclosed in my co-pending application, Serial No. 24,781, dated May 3, 1948 (now Patent No. 2,640,451, dated June 2, 1953), an improved machine for forming such rectangular tubing. That machine, however, is capable of producing only tubing which is of uniform diameter throughout its length. The present invention comprehends apparatus which is capable of producing tapered, flexible, metal tubing of various cross-sectional shapes, but for present purposes, the apparatus is illustrated and described herein only in its adaptation for the purpose of manufacturing such tapered tubing of rectangular cross-section.

It may thus be understood that an important object of the present invention is the provision of improved apparatus for making tapered flexible tubing.

Another important object of this invention is the provision of such apparatus which may readily be adapted and adjusted to produce such tapered tubing of various sizes or of various shapes in cross-section.

Another important object is the provision of such apparatus which may readily be operatively combined or associated with certain conventional machine tools such as lathes of generally conventional design.

The present invention utilizes some of the principles embodied in the structure described in my above-mentioned co-pending application and reference may be made thereto for further details of parts which are common to both structures and as to which the description herein may be more

2 or less general in the interest of laying emphasis upon the novel aspects of the present invention.

The foregoing objects and other objects and advantages are derived by this invention of which an embodiment is disclosed for illustrative purposes in the accompanying drawings without, however, limiting the invention to that disclosed embodiment.

In the drawings:

Figure 1 is a perspective view of a preferred embodiment of this invention as associated and combined with a conventional lathe.

Fig. 2 is a fragmentary plan view of the apparatus illustrated in Fig. 1.

Fig. 3 is an end view of the apparatus shown partly in elevation and partly in section on the irregular line 3—3 of Fig. 2.

Fig. 4 is a side elevational view of strip guiding and seam forming parts of the machine, some parts in this view being in vertical section substantially on the line 4—4 of Fig. 2.

Fig. 5 is an enlarged detailed view of the portion of the apparatus where longitudinally-ribbed metal strip is guided to and spirally wound upon an arbor and interlocked to give it the desired tubular form; this figure being partly in elevation and partly in section to illustrate the nature of the interlock of adjacent turns of the strip.

Fig. 6 is an enlarged cross-sectional view through longitudinally preformed or ridged metal strip showing the manner of association therewith of a solder wire and a support wire as the strip is about to be spirally wound upon an arbor.

An apparatus according to this invention may include or be used in combination with a more or less conventional lathe 11 mounted upon a suitable table 12. The lathe includes a face plate 13 having a center pin 14, the two latter being rotatably driven in a well understood manner by an electric motor 15 through transmission means including a pulley 16 fixed to the spindle of the motor, a belt 17 coacting with the pulley 16 and with a pulley 18 fixed on a pulley shaft 19, a second pulley 20 on said shaft and a belt 21 which coacts with the pulley 20 and with a pulley 22 which is fixed on a common shaft 23 with the faceplate 13 and center pin 14 to drive the two latter parts. The pulley shaft may have a crank handle 19a keyed thereon so that the various parts of the machine may be turned slowly by hand to facilitate setting the machine up for operation.

The lathe also includes a second center pin 24 suitably supported in spaced, axial alignment with reference to the center pin 14, in a headstock 25, which is slidable and guided longitudinally on rails 25a, the space between the pins 14 and 24 being quite substantial to provide a gap therebetween. A tool-carrying saddle 26 is mounted and guided on rails 26a, for sliding movement below said gap and in parallelism with the axes of the mentioned center pins; and the saddle is caused to pursue such movement by a lead screw 27 driven by a gear train 28 which, in turn, is driven by the shaft 23.

The foregoing general description is directed to a more or less conventional lathe. Apparatus according to the present invention, which may be associated and combined with such a lathe, includes a tapered arbor 29 of rectangular cross-section, which is held between the center pins 14 and 24 with the tapered ends of those pins extending into concentric recesses in the ends of the arbor. The pin 24, of course, may be adjusted axially by manipulation of an adjusting wheel 30 to bring the pins into the mentioned recesses in order to hold the arbor firmly in place therebetween. A driving lug 31 fixed to the faceplate 13 has a bifurcated free end comprising fingers 32 which extend in intimate contact with opposite sides of the adjacent end of the arbor 29 to constrain the latter to rotate with the face plate.

As best seen in Fig. 3 the arbor 29 is rectangular in cross-section and is tapered from a larger width and thickness adjacent the tailstock center pin 24 to a smaller width and thickness adjacent the faceplate center pin 14. The arbor 29, like the rectangular arbor disclosed in my mentioned co-pending application, serves as a form upon which a metal strip is spirally wound to form it into tubing. The mentioned taper may progress uniformly from one end of the arbor to the other as shown, or, if desired, the end parts of the arbor may be non-tapering and the taper may be limited to an intermediate portion of the arbor. Obviously, arbors of different sizes and cross-sectional shapes and with different degrees of taper may be substituted in the machine if different shapes and sizes of tubing are to be produced.

Apparatus for pre-forming longitudinal ridges in the metal strip and for guiding such ridged strip onto the arbor may be carried upon the saddle 26. More particularly, the saddle 26 in conventional lathes commonly is provided with a transversely adjustable plate 33 having a rotatable adjusting crank handle 34 coacting therewith to yield such transverse adjustment; and in practicing the present invention the mentioned apparatus for forming the strip and guiding it onto the arbor may be adjustably mounted upon the plate 33.

Considered collectively the present apparatus for pre-forming and guiding the strip is very similar to preforming and guiding apparatus disclosed and described in my mentioned co-pending application, but, in certain respects, it differs therefrom. According to the present invention, for example, the arbor and the apparatus for pre-forming and guiding the strip, are movable relatively to each other in a direction parallel to the longitudinal axis of the arbor while such relative movement is not present in the structure of my said earlier application. Also, in contrast to the mentioned earlier structure, the apparatus disclosed herein does not slide the formed tubing portion axially along the arbor to strip it therefrom but is designed to leave the spirally wound strip on the arbor until the winding thereof is completed, in order that the formed tubing may derive and retain the tapered cross-sectional form of the arbor. Other differences will be discernible from a comparison of the two structures.

According to this invention, a reel 35 carrying suitable metal strip material is mounted for rotation about the axis of a horizontally disposed stub shaft 36 which is mounted for pivotal adjustment about a vertical axis upon the front end of a reel support 37 which is suitably secured as by a bolt 38 on a front face of the saddle 26. Strip 39 pays off from the reel 35 in a generally upward direction to an assembly of forming rolls arranged in pairs of rolls 40a, 40b, 40c. The forming roll assembly also includes a pilot roll 40d which serves to guide the strip 39 properly to the rolls 40a. The several rolls 40a, b, c, and d are suitably mounted on a roll frame 41 which includes means for adjusting the upper roll of each of said pairs of rolls vertically relatively to the lower rolls of corresponding pairs in a manner well understood in this art.

The roll frame 41 is carried upon the front end of of a roll support 42 which is preferably secured, by a single bolt 43, at its rearward end upon a mounting plate 44, for pivotal adjustment in a generally horizontal plane. The peripheries of the several mentioned pairs of forming rolls are of such contour that as the strip passes between the roll pairs 40a, b, c, in the stated order it is progressively shaped longitudinally until upon emerging from the roll pair 40c it is of a cross-sectional shape substantially as shown in Fig. 6.

The mounting plate 44 preferably is mounted upon a tool carrier 45 which, as is common in lathes, is mounted for rotative adjustment about a vertical axis upon the plate 33. The mounting of the plate 44 upon the carrier 45 may be in the nature of a tongue and groove arrangement in which a headed bolt 46 as well as the bolt 43 extend downwardly through the plate 44 and through the mouth of a groove 47 and thread into a washer plate 48 disposed within a bottom groove portion 49, the latter portion being enlarged in its width and the washer plate being of such width that it cannot pass vertically through the mouth of the groove. Although the plate 33 and the tool carrier 45 are used to carry the principal parts of a structure according to this invention, nevertheless the sliding and rotative adjustability of those parts, respectively, need rarely or never be availed of in practicing this invention.

The strip 39, formed longitudinally between forming rolls in the manner just explained, moves to the arbor 29 to be wrapped therearound spirally to form it into tubing. If the leading end of the strip is secured to the arbor, rotation of the arbor will cause the strip to wind itself around the arbor. In order to form the strip into tubing however, it is necessary for the strip to be so guided onto the arbor that adjacent edges of successive turns of the strip will overlap and be interlocked to form a continuous spiral seam.

The means for guiding the longitudinally formed strip 39 onto the arbor 29 in proper edge-interlocking relationship preferably comprises a chute 50, adjustably secured in a depending position, directly above the arbor 29, upon an intermediate portion of an upper horizontal arm 51 which has a depending arm 52 rigidly associated therewith at its front end, pivotally mounted at its lower end to the mounting plate 44 by a pivot pin 53. The chute 50 may advantageously be secured to the arm 51 by two bolts 50x one of which extends through an elongated bolt hole 50y in the chute to permit limited angular adjustment of the latter about a vertical axis.

The apparatus also preferably includes a seaming roll 54, slidably and rotatably supported in position, directly beneath the arbor, upon a generally longitudinally extending axle pin 55 carried within a yoke 56 which in turn is adjustably secured on the top of and at an intermediate portion of a lower horizontal arm 57 by a single bolt 56x which may be loosened to permit angular adjustment of the seaming roll about a vertical axis. The arm 57 preferably is pivoted at its front end to the tool carrier 45 by a horizontally extending pivot pin 58 and carried in a bracket 59 suitably fixed to the rear face of the tool carrier.

The horizontal arms 51 and 57 are arranged so that both of them pivot in a common vertical plane, and the maintenance of this vertical interrelationship is assured by the provision of depending guide arms 60 which are fixed to opposite sides of arm 51 toward the latter's rearward end and extend downwardly in intimate sliding association with opposite sides of the lower horizontal arm 57. The arms 51 and 57 are yieldably urged toward each other by a tensioned coil spring 61 which is secured at its lower end to the rear or free end of the arm 57 and at its upper end to an extension 62 which extends upwardly from the horizontal arm 51.

As may be seen by reference to Figs. 1 and 3 the centers of the chute 50 and of the seaming roll 54 are in vertical alignment with the axis of the arbor 29. It may be seen also that the chute's longitudinal dimension, which is its dimension transversely of the arbor, is greater than the largest diameter of the arbor and preferably should be greater than the largest diameter of any arbor which might be substituted for use with it in the apparatus.

At the top of Fig. 5 there is shown a fragmentary endwise view of the chute 50 from which it may be seen that its bottom surfaces are of approximately the same cross-sectional configuration as the upper side of the longitudinally shaped strip as shown in Fig. 6. Thus, the chute, being urged downwardly by the spring 61, and to some extent by gravity, will hold the strip intimately upon the arbor 29 as the latter rotates so that the strip will be bent closely around each corner of the arbor as that corner moves in its circular path underneath the chute. The chute, by adjustment of its mounting on horizontal arm 51, is adjusted so that it extends at an angle to the axis of the arbor which corresponds to the helix pitch of the strip wound upon the arbor.

The seaming roll 54, preferably, is arranged at an angle to the axis of the arbor corresponding to the helix pitch and the strip wound thereon. In view of the fact that the chute is above the arbor and the seaming roll is below the arbor those two parts will be in opposite angularity relatively to the arbor's axis. The seaming roll surfaces as best seen in Figs. 4 and 5 are such that they operate to press down tightly the interlocking adjacent edges of successive turns of the wound strip to fold those edges and press them down into a tight seam 63 as best seen at the bottom of Fig. 5.

Various supplemental guide means are advantageously employed for different purposes. For example, a guide lug 64 with a horizontal guide tongue 65, underlying, supporting and guiding the strip 39, may be suitably fixed to the front end of the chute 50. Also a bracket 66, suitably fixed upon the roll support 42, may carry a first guide roll 67 which is rotatable on a horizontal axis and which guides support wire 68 from a suitably supported reel 69 to a second guide roll 70 which is mounted on a vertical axis on the bracket 66 and guides the support wire to the underside of the longitudinally preformed strip 39 so that the mentioned support wire moves with the strip beneath the chute and onto the arbor in the association with that strip indicated in Fig. 6. As best seen at the bottom of Fig. 5, the support wire 68 affords support underneath the seam 63 when the latter is being pressed tightly closed by the seaming roll 54. The support wire 68 also serves to prevent material cross-sectional distortion of the longitudinally formed strip as the latter is wound about the rotating arbor.

The mentioned supplemental guiding means also include means which may be in the form of a wire loop 71 secured to the bracket 66. String solder 72, preferably having flux thereon or incorporated therein, is drawn from a suitably disposed spool, not shown in the drawings, and passes through the loop 71 to a position underlying the strip 39 as the latter passes beneath the chute and is wound about the arbor. The precise position which the string solder assumes with reference to the strip is best seen in Fig. 6; and from Fig. 5 it is clear that the solder 72 ultimately becomes disposed within the seam 63. At some time after formation of the tubing, the latter is heated sufficiently to render the solder fluid and then is permitted to cool so that the solder will set, to seal and bond the seam.

In operation, an arbor 29 is selected which is tapered or which has a tapered portion of graduated diameters corresponding to the graduated inner diameters of flexible metal tubing which is to be made in tapered form on the machine. By suitable longitudinal adjustment of the headstock 25 by the latter's adjusting wheel 30, the arbor 29 may be held firmly between the center pins 14 and 24 with the points of the pins seated within concentric recesses in the opposite ends of the arbor. The driving lug 31, also, is fixed with its fingers 32 in driving position at opposite sides of the arbor.

The pitch at which the strip is to be wound depends upon the diameter and the distance between successive convolutions of the tubing to be made. The operator, having determined the pitch, will verify that the gear ratio between the arbor and the lead screw 27 through the gear train 28 is such that, in operation, the saddle 26 will be automatically moved horizontally rightwardly a distance which, for each complete revolution of the arbor, corresponds to the distance between the convolutions to be formed in the tubing. If this gear ratio is not as thus stated, the operator may substitute proper gears in the gear train 28 to derive that desired gear ratio. He will also verify that the chute 50 and the seaming roll 54 are adjusted, on the arms 51, 57, to the proper angularity with respect to the axis of the arbor so that the strip is guided onto the arbor and seamed at the desired pitch; and he will also adjust the forming roll assembly to the same angularity by adjustment of the position of the support 42.

In setting up the machine for operation, a reel 35 of suitable metal strip material is placed upon the stub shaft 36. The end of this strip material is passed upwardly between the pilot roll 40d and the lowermost of the pair of rolls 40a to and between the two rolls 40a, thence between rolls 40b and 40c. It may facilitate threading the metal strip through said pairs of rolls 40a, b, c, to ease off the adjustment therebetween; and, after the strip has been threaded through said rolls, the adjustment may then be tightened to yield the desired form to the strip thereafter passing therethrough.

The leading end of the strip 39 is then passed from the forming rolls, thence over the guide tongue 65 and under the chute 50 and over and partially around the arbor 29. In passing it partially around the arbor 29, the leading portion of the strip may be manually bent around one or several corners of the arbor after which the strip will wind upon the arbor in the desired manner as the latter turns.

The leading end of string 72 of string solder, drawn from a suitably positioned spool, may be threaded through the wire loop 71 and thence to its proper position beneath the strip 39 as indicated in Fig. 6. Also, the leading end portion of the support wire 68 may be passed from the reel 69, over guide roll 67, thence partially around guide roll 70 from which it is passed to its proper point in association with and beneath the strip 39 as indicated in Fig. 6. It is preferable to associate the leading ends of the strip 39, the solder string 72, and the support wire 68, in their above-described relationship before the strip is manually wound partly upon the arbor.

After having adjusted the various parts in the manner just explained, the electric motor 15 is started, whereupon the arbor rotates in the direction shown by directional arrows. As the large and small faces of the arbor alternately pass directly underneath the chute 50 and above the seaming roll 54 the horizontal arms 51 and 57 rise and fall oppositely to each other in response to the action of the spring 61 so that, at all times during such rotation of the arbor, the chute is winding and, to some extent, pressing the strip upon the arbor and the seaming roll is continuously pressing down the interlocking portions of successive strips to form the seam 63.

The flexible metal tubing made on this machine would be of limited lengths, governed by the length of the arbor used in the machine. Regardless of the length of the arbor used the operation of the machine is discontinued by the operator as soon as or perhaps before the winding of the strip is occurring at the end toward which the winding is directed. When that stage in operation is reached, the machine is stopped and the strip is cut preferably at some point in the last turn of strip which has been wound upon the arbor. Then, the saddle 26 may be returned by manipulation of the handwheel 26b to an initial strip feeding position in preparation for the production of another length of tapered flexible tubing.

When it is desired to adjust the machine for making a different size of tubing, a substitute arbor of a correspondingly different size is inserted in the machine and, if the size of the tubing is such that the same size of strip material can be used, no other adjustments ordinarily are necessary. However, if the machine is to be readjusted so that after making tapered tubing of one average diameter thereon, it is desired to produce tubing of a considerably different average diameter, it may be necessary not only to change the arbor but also to substitute strip of a different width and/or thickness. In the latter situation it would ordinarily be necessary to substitute a different chute, seaming roll and/or a different set of forming rolls for the rolls 40a, b, c. Also, when the machine is being readjusted to produce tubing of much different diameter than that previously produced by the machine, it may also be necessary to readjust the angularity of the chute, the seaming roll, and the forming roll support relatively to the axis of the arbor.

As the angularity of the chute 50 and of the seaming roll 54 may be readily adjusted relatively to the arms 51 and 57, which respectively carry those parts, there would be no necessity for angularly readjusting the tool carrier 45. Therefore, it would be entirely feasible to provide a specially designed, simplified support for carrying the arms 51, 57 and the roll support 42 and all the various instrumentalities carried on those parts. Such a specially designed support need not be rotatable about a vertical axis as is the tool carrier 45, and it need not be slidable transversely of the lathe as is the plate 33 upon which the tool carrier 45 is mounted. However, the various lathe parts just referred to have been shown in the drawing and the strip forming, guiding and winding mechanism has been shown in association therewith to illustrate the manner in which this mechanism may readily be applied to a conventional lathe.

Only a single embodiment of the present invention has been disclosed and described herein for illustrative purposes. However, it should readily be appreciated that the apparatus may be modified in various details to achieve the stated objects of this invention. Therefore the present invention is not to be considered as limited to the single illustrated and described embodiment but is to be considered as comprehending all variations thereof within the invention as defined in the following claims.

What I claim is:

1. Apparatus for making tapered flexible tubing, comprising a continuously rotatable arbor tapered to correspond approximately to the inside taper of the tubing to be made, a traveling saddle guided for movement in a line parallel to the axis of the arbor, driving means coacting with the arbor and saddle to rotate the arbor and cause such movement of the saddle in a predetermined ratio to the rotation of the arbor, a chute at one side of the arbor and carried by said saddle, the said chute being adapted to feed strip material spirally to the arbor and being adjustable angularly relatively to the arbor to adapt it to feed strip spirally at different angles, the apparatus further including a circumferentially grooved seaming roll at the other side of the arbor for rolling down a seam which joins successive turns of strip, the said seaming roll being adjustable angularly relatively to the arbor to dispose the plane of the grooving of the seaming roll in parallelism with the adjacent portion of said seam; the arbor being polygonal in cross-section, and the chute and seaming roll being reciprocatorily associated with the saddle and having biasing means coacting therewith yieldably urging them toward the arbor and enabling them to move to and fro relatively to each other to maintain close association with the arbor at all its different cross-sectional diameters during the winding of strip thereon.

2. Apparatus according to claim 1, the feeding means including a pair of arms pivotally mounted on the saddle and adapted for pivotal movement transversely of the arbor, the chute being carried by one of said arms at an intermediate point thereof, the seaming roll being carried by the other of said arms at an intermediate point thereof, and the biasing means comprising a tension spring operatively connected between the opposite free ends of said arms to urge the chute and seaming roll yieldably toward each other to maintain them in intimate association with the arbor during the winding of strip thereon.

3. Apparatus for making tapered flexible tubing of polygonal cross-section, comprising a continuously rotatable arbor of polygonal cross-section, having a portion which is tapered longitudinally thereof, feeding means adapted to feed strip material spirally to the arbor, the arbor and feeding means being movable relatively to each other in parallelism with the longitudinal axis of the arbor, and driving means coacting with the arbor and the feeding means for rotating the arbor and for causing such relative movement of the two in timed relationship to the arbor's rotation; the feeding means comprising a reel for carrying a supply of strip material, forming rolls for longitudinally forming strip material emerging from the reel, two pivotally interconnected arms extending transversely of the arbor at opposite sides thereof, means yieldably urging said arms toward each other and each toward the arbor, a chute on one of said arms having a grooved surface in continuous close association with the arbor and having the grooving in said surface directed to receive strip material from the forming rolls and to guide it spirally onto the rotating arbor, and a seaming device on the other of said arms adapted to press together the adjacent edges of successive turns of the strip material wound on the arbor.

4. Tube forming apparatus adapted for attachment to a lathe having opposed center pins, a traveling saddle and driving means for rotating a member held between said pins and for moving said saddle in parallelism to the axis of said pins in timed relationship; the said apparatus comprising a pair of arms adapted, at corresponding restricted ends, for pivotal attachment to such a saddle for independent pivotal movement transversely of the said axis of the pins, a tapered, polygonal arbor adapted for mounting between said pins and between said arms, strip guiding means, on one of said arms, adapted to guide strip material spirally onto the rotating arbor, seaming means on the other of said arms adapted to aid in forming a spiral seam which interconnects adjacent edges of successive turns of strip material on said arbor, and resilient means operatively interconnected between opposite free ends of said arms for yieldably urging said arms toward each other to maintain the guiding and seaming means in continuous association with the arbor and with strip being wound thereon.

5. Apparatus according to claim 4, further including strip forming means adapted for forming strip material longitudinally and for being mounted on such a saddle in position to pass the formed strip material directly to said strip guiding means.

6. Apparatus according to claim 4, further including a strip supply holder and an assembly of forming rolls for longitudinally forming strip material, the said holder and assembly being adapted for mounting on such a saddle approximately in a common plane with the strip guiding means.

7. Apparatus for making tapered, flat-sided, flexible tubing, comprising a continuously rotatable, flat-sided, tapered arbor of a shape corresponding approximately to the inside shape of the tubing to be made, a saddle which is translationally movable relatively to said arbor, guiding means coacting with the arbor and the saddle to limit the two, with respect to translational movement, to relative movement in parallelism to the arbor's axis of rotation, driving means coacting with the arbor and saddle to rotate the arbor and impart such relative translational movement to the saddle and arbor in a predetermined ratio to the arbor's rotation, separate arms extending at opposite sides of the arbor and supported on said saddle for pivotal movement transversely of the arbor, contractile spring means interconnecting said arms to urge them toward the arbor, a straight, strip feeding chute, of a length at least as great as the width of any flat side of the arbor, carried by one of said arms and disposed to feed strip material tangentially to the arbor, said chute coacting continuously with the arbor at the latter's various diameters to oscillate in a plane transverse to the arbor's axis of rotation whereby to maintain intimate feeding association with successively presented sides of the arbor during such rotation, and seaming means carried by the other of said arms in close association with strip wound upon the arbor for oscillation in a plane transverse to the arbor's axis of rotation; the said seaming means being subject to the force of said spring means which urge said seaming means yieldably into continuous pressing association with a seam, which joins successive turns of strip material on the arbor, to press said seam tightly closed.

References Cited in the file of this patent

UNITED STATES PATENTS

| Number | Name | Date |
| --- | --- | --- |
| 635,039 | Emerson | Oct. 17, 1899 |
| 785,523 | Scognamillo | Mar. 21, 1905 |
| 1,799,918 | Marsden | Apr. 7, 1931 |
| 2,049,100 | Baker | July 28, 1936 |
| 2,339,219 | Crowley | Jan. 11, 1944 |
| 2,440,792 | Wyllie | May 4, 1948 |

FOREIGN PATENTS

| Number | Country | Date |
| --- | --- | --- |
| 7,979 | Australia | Sept. 7, 1933 |